United States Patent [19]

Ogino

[11] 4,264,136
[45] Apr. 28, 1981

[54] CATADIOPTRIC LENS SYSTEM

[75] Inventor: Shuji Ogino, Osaka, Japan

[73] Assignee: Minolta Camera Kabushiki Kaisha, Osaka, Japan

[21] Appl. No.: 65,995

[22] Filed: Aug. 13, 1979

[30] Foreign Application Priority Data

Aug. 25, 1978 [JP] Japan ................................. 53-104188

[51] Int. Cl.$^3$ .............................................. G02B 17/08
[52] U.S. Cl. .................................................. 350/444
[58] Field of Search ............................. 350/201, 199

[56] References Cited

U.S. PATENT DOCUMENTS

| | | | |
|---|---|---|---|
| 3,507,556 | 4/1970 | Shimizu | 350/201 |
| 3,632,190 | 1/1972 | Shimizu | 350/201 |
| 4,061,420 | 12/1977 | Kaprelian | 350/201 |
| 4,165,151 | 8/1979 | Momiyama | 350/201 |
| 4,188,091 | 2/1980 | Fujii | 350/201 |

FOREIGN PATENT DOCUMENTS 53-76830  7/1978  Japan .

*Primary Examiner*—Conrad J. Clark
*Attorney, Agent, or Firm*—Jackson, Jones & Price

[57] ABSTRACT

A compact catadioptric lens system with a widened field angle is disclosed and characterized in that the axial distance L between the main-mirror element ($M_1$) and the sub-mirror element ($M_2$) fulfills the following condition in relation to the diagonal length D of the rectangular focal plane on which the image is projected:

$$1.5D > L > 0.5D,$$

and that the radius of curvature $R_5$ of the image side surface of the sub-mirror element and the radius of curvature $R_6$ of the object side surface of the same fulfill the following condition in relation to the focal length f of the system:

$$0.8f > \frac{R_5 \cdot R_6}{R_6 - 3R_5} > 0.25f.$$

12 Claims, 16 Drawing Figures

Hmm

F5.0

-0.05 0.05
Spherical Aberration
Sine Condition

FIG.2b

Ymm

Δm Δs  ω=4°50'

-0.05 0.05
Astigmatism

FIG.2c

Ymm

ω=4°50'

-2.0 2.0
Distortion

Spherical Aberration
Sine Condition

FIG.4b

Astigmatism

FIG.4c

Distortion

Spherical Aberration
Sine Condition

FIG.6b

Astigmatism

FIG.6c

Distortion

Spherical Aberration
Sine Condition

FIG.8b

Astigmatism

FIG.8c

Distortion

CATADIOPTRIC LENS SYSTEM

BACKGROUND OF THE INVENTION

1. Field of the Invention

This invention relates to a catadioptric lens system which forms an image by means of both the refraction and the reflection of the light rays.

2. Description of the Prior Art

There is known in the art that the catadioptric lens system is adapted for ultratelephoto lens systems since the total length of the system is remarkably reduced and the spectra of the second degree are decrease by the adoption of the catadioptric lens system.

Various catadioptric lens systems have been suggested such as those disclosed in U.S. Pat. No. 3,507,556; U.S. Pat. No. 3,632,190; and Japanese Patent Applications laid open to the public inspection under Nos. 52-155549 and 53-76830.

In the catadioptric lens sytem, however, it is difficult to increase the field angle of the lens system, and in fact, field angles less than 5 degrees are of known catadioptric lens systems practically designed to use in 35mm SLR camera. This difficulty in increasing the field angle of catadioptric lens system is caused by its characteristic light path which reciprocates between the main-mirror and the sub-mirror. Although it is required to avoid the possible intersection of the light pencils directed to or reflected on the main-mirror with the light pencils traveling from the sub-mirror to the image surface, it becomes extremely difficult to meet this requirement as the field angle is increased. In other words, an off-axial light pencil reflected on the sub-mirror is caused to pass through the main-mirror at a portion considerably off the optical axis of the system when the field angle is to be increased, which means that the main-mirror should have a sufficiently large inner effective diameter to allow the passage of such an off-axial light pencil. This leads to an inevitable increase in the outer effective diameter of the main-mirror if a sufficient illumination by the off-axial rays is desired to be maintained. Thus, an undesirably thick lens system would result from the increase of the field angle. Further, the excessively large inner effective diameter of the main-mirror results in a deterioration of the lens performance caused by the diffraction of light.

SUMMARY OF THE INVENTION

It is an object of the present invention to successfully increase the field angle of the catadioptric lens system.

It is another object of the present invention to increase the field angle to about 10 degrees.

It is still another object of the present invention to provide an improved catadioptric lens system of a minimized diameter and total length of the system although the field angle is increased.

It is further object of the present invention to provide a compact catadioptric lens system of a relatively increased field angle with sufficient aberration corrections.

The above stated and other objects and advantages are attained by a catadioptric lens system characterized in that the axial distance L between the main-mirror element and the sub-mirror element fulfills the following condition in relation to the diagonal length D of the rectangular focal plane on which the image is projected:

$$1.5D > L > 0.5D$$

Further, according to the present invention it is proposed that the radius of curvature $R_5$ of the image side surface of the sub-mirror element and the radius of curvature $R_6$ of the object side surface of the sub-mirror element serving as the reflecting surface faced to the image side fulfill the following condition in relation to the focal length f of the system:

$$0.8f > \frac{R_5 \cdot R_6}{R_6 - 3R_5} > 0.25f$$

The features of the present invention which are believed to be novel are set forth in particularity in the appended claims. The present invention, both as to its organization and manner of operation, together with further objects and advantages thereof, may be best understood by reference to the following description taken in conjunction with the accompanying drawings.

DESCRIPTION OF THE PREFERRED EMBODIMENTS

The following description is provided to enable any person skilled in the optical arts to make and use the invention and sets forth the best modes contemplated by the inventor of carrying out his invention. Various modifications, however, will remain readily apparent to those skilled in the art, since the generic principles of the present invention have been defined herein specifically to provide a catadioptric lens system that can be manufactured in a relatively economical manner.

In the accompanying drawings which are further supplemented by the enclosed tables, the lenses in accordance with the present invention are illustrated diagrammatically with light being assumed to travel from left to right with reciprocation between the main-mirror and sub-mirror. Optical components are designated with capital letters. The radii of curvature of the elements are indicated by r, and the axial distances between refractive or reflective surfaces by d. The subscripts are numbered in the order of the transmission of the light ray. The letter r or d with a single prime (') means the second occurrence of the same surface r or axial distance d, e.g., a ray once passed through $r_3$ is again transmitted through the same surface $r_3$ after reflection on $r_4$, and $r_3$ in case of this second occurrence is represented by $r_3'$. In a similar manner, a letter with a double prime (") indicates the third occurrence thereof in accordance with the transmission of light ray. Symbol d or N with a minus sign indicates that the ray travels from right to left within the axial distance.

FIGS. 1, 3, 5 and 7 schematically show the first to fourth embodiments of the present invention, respectively, and the pertinent data of these embodiments are disclosed in Tables 1 to 4. As seen from the FIGS. 1, 3, 5 and 7, the preferred embodiments of the present invention comprise, in the order of the transmission of light ray in the system, a positive single lens ($L_1$) having an object side surface convex to the object side; a main mirror element ($M_1$) composed of a negative meniscus single lens element concave to the object side, the image side surface of which serves as a reflecting surface faced to the object side; a sub-mirror element ($M_2$) composed of a positive meniscus single lens element convex to the image side, the object side surface of which serves as a reflecting surface faced to the image side; and a lens component ($L_R$) of a negative refractive power including the last refracting surface of the system. The catadioptric lens system according to the present invention fulfills the following conditions:

$$1.5D > L > 0.5D \quad (1)$$

$$0.9f > \frac{R_3 \cdot R_4}{R_4 - 3R_3} > 0.27f \quad (2)$$

$$0.8f > \frac{R_5 \cdot R_6}{R_6 - 3R_5} > 0.25f \quad (3)$$

$$0.7f > -f_R > 0.15f \quad (4)$$

wherein:

D represents the diagonal length of the rectangular focal plane on which the image is projected;

L represents the axial distance between the main-mirror element ($M_1$) and the sub-mirror element; f represents the focal length of the whole system;

$R_3$ represents the radius of curvature of the object side surface of the main-mirror element ($M_1$);

$R_4$ represents the radius of curvature of the image side surface (reflecting surface) of the main-mirror element ($M_1$);

$R_5$ represents the radius of curvature of the image side surface of the sub-mirror element ($M_2$);

$R_6$ represents the radius of curvature of the object side surface (reflecting surface) of the sub-mirror element ($M_2$); and $f_R$ represents the focal length of the lens component ($L_R$).

Condition (1) defines the distance between the main-mirror $M_1$ and the sub-mirror $M_2$ relative to the diagonal length of the rectangular focal plane for restricting the increase of the diameter and the total length of the lens system, which would be caused by the increase of the field angle, within the limit of practical size. If L increases beyond the upper limit of this condition, it becomes necessary to extremely increase the inner effective diameter of $M_1$, hence, the outer effective diameter of $M_1$ is required to be increased. Furthermore, in order to maintain the appropriate illumination in the marginal area of the image surface, it becomes necessary to increase considerably the effective diameter of $L_1$. If L decreases below the lower limit of this condition, on the contrary, the back focal distance, which is the distance between the last image-side surface of the lens system and the image surface, will be increased to result in an undesirably long total length of the lens system. Although, it may be possible to decrease the back focal distance alone by the decrease of $-f_R$ beyond the lower limit of condition (4), even in the case that L is reduced beyond the lower limit of condition (1), an increase of flare due to the spherical aberration would result in this case, and practical performance can not be achieved.

Condition (2) defines the lens shape of the main-mirror $M_1$. If the upper limit of this condition is violated, the diameter of the sub-mirror would have to be enlarged, since the refractive power of the main-mirror would be excessively decreased, further, the diameter of $L_1$ would have to be enlarged in order to maintain the appropriate illumination at the image surface, and the total length of the lens system will be lengthened. If the lower limit of this condition is violated, the flare of the coma would be increasingly generated since the refractive power of the main-mirror would be excessively increased.

Condition (3) defines the lens shape of the sub-mirror $M_2$. If the upper limit of this condition is violated, it will be required to lengthen the total length of the lens system since the refractive power of the sub-mirror would be excessively decreased. If the lower limit of this condition is violated, the flare due to the spherical aberration would be increasingly generated since the refractive power of the sub-mirror would be excessively increased.

Condition (4) defines the range of the focal length of the lens component $L_R$ to successfully reduce the total length of the lens system with the necessary aberration correction. If the upper limit of this condition is violated, the total length of the lens system would be increased since the back focal distance would be increased. If the lower limit of this condition is violated, the flare due to the spherical aberration and the positive distortion would be increasingly generated, although the total length of the lens system may be decreased.

TABLE 1

[Embodiment 1]
$f = 100.0 \quad 2\omega = 9°40'$

| | | Radius of Curvature | | Axial Distance | | Refractive Index | | Abbe Number |
|---|---|---|---|---|---|---|---|---|
| $L_1$ | $r_1$ | 39.947 | | | | | | |
| | | | $d_1$ | 2.000 | $N_1$ | 1.5168 | $\nu_1$ | 64.1 |
| | $r_2$ | 275.478 | | | | | | |
| | | | $d_2$ | 16.000 | | | | |
| | $r_3$ | −42.286 | | | | | | |

TABLE 1-continued

[Embodiment 1]
$f = 100.0 \quad 2\omega = 9°40'$

| | | Radius of Curvature | | Axial Distance | | Refractive Index | | Abbe Number |
|---|---|---|---|---|---|---|---|---|
| | | | $d_3$ | 1.600 | $N_2$ | 1.7005 | $\nu_2$ | 30.1 |
| $M_1$ | $r_4$ | −76.274 | | | | | | |
| | | | $d_{3'}$ | −1.600 | $N_{2'}$ | −1.7005 | $\nu_{2'}$ | 30.1 |
| | $r_{3'}$ | −42.286 | | | | | | |
| | | | $d_4$ | −14.000 | | | | |
| | $r_5$ | −30.214 | | | | | | |
| | | | $d_5$ | −1.000 | $N_3$ | −1.7005 | $\nu_3$ | 30.1 |
| $M_2$ | $r_6$ | −61.263 | | | | | | |
| | | | $d_{5'}$ | 1.000 | $N_{3'}$ | 1.7005 | $\nu_{3'}$ | 30.1 |
| | $r_{5'}$ | −30.214 | | | | | | |
| | | | $d_6$ | 13.400 | | | | |
| | $r_7$ | −14.924 | | | | | | |
| | | | $d_7$ | 0.600 | $N_4$ | 1.5168 | $\nu_4$ | 64.1 |
| $L_R$ | | | | | | | | |
| | $r_{3''}$ | −42.286 | | | | | | |
| $M_1$ | | | $d_{3''}$ | 1.600 | $N_{2''}$ | 1.7005 | $\nu_{2''}$ | 30.1 |
| | $r_{4'}$ | −76.274 | | | | | | |

$D = 17.3$
$L = 14.0$
$f_R = -34.03$

TABLE 2

[Embodiment 2]
$f = 100.0 \quad 2\omega = 9°40'$

| | | Radius of Curvature | | Axial Distance | | Refractive Index | | Abbe Number |
|---|---|---|---|---|---|---|---|---|
| | $r_1$ | 60.572 | | | | | | |
| $L_1$ | | | $d_1$ | 2.000 | $N_1$ | 1.5176 | $\nu_1$ | 53.5 |
| | $r_2$ | 173.817 | | | | | | |
| | | | $d_2$ | 15.600 | | | | |
| | $r_3$ | −29.825 | | | | | | |
| | | | $d_3$ | 1.600 | $N_2$ | 1.5168 | $\nu_2$ | 64.1 |
| $M_1$ | $r_4$ | −51.174 | | | | | | |
| | | | $d_{3'}$ | −1.600 | $N_{2'}$ | −1.5168 | $\nu_{2'}$ | 64.1 |
| | $r_{3'}$ | −29.825 | | | | | | |
| | | | $d_4$ | −13.600 | | | | |
| | $r_5$ | −19.373 | | | | | | |
| | | | $d_5$ | −1.000 | $N_3$ | −1.5168 | $\nu_3$ | 64.1 |
| $M_2$ | $r_6$ | −36.927 | | | | | | |
| | | | $d_{5'}$ | 1.000 | $N_{3'}$ | 1.5168 | $\nu_{3'}$ | 64.1 |
| | $r_{5'}$ | −19.373 | | | | | | |
| | | | $d_{4'}$ | 13.600 | | | | |
| | $r_{3''}$ | −29.825 | | | | | | |
| $M_1$ | | | $d_{3''}$ | 1.600 | $N_{2''}$ | 1.5168 | $\nu_{2''}$ | 64.1 |
| | $r_{4'}$ | −51.174 | | | | | | |
| $L_R$ | | | $d_6$ | 1.200 | | | | |
| | $r_7$ | −13.015 | | | | | | |
| | | | $d_7$ | 0.560 | $N_4$ | 1.5168 | $\nu_4$ | 64.1 |
| | $r_8$ | 266.647 | | | | | | |
| | | | $d_8$ | 0.760 | $N_5$ | 11.7400 | $\nu_5$ | 28.3 |
| | $r_9$ | −77.979 | | | | | | |

$D = 17.3$
$L = 13.6$
$f_R = -27.15$

TABLE 3

[Embodiment 3]
$f = 100.0 \quad 2\omega = 9°40'$

| | | Radius of Curvature | | Axial Distance | | Refractive Index | | Abbe Number |
|---|---|---|---|---|---|---|---|---|
| | $r_1$ | 42.109 | | | | | | |
| $L_1$ | | | $d_1$ | 2.000 | $N_1$ | 1.5168 | $\nu_1$ | 64.1 |
| | $r_2$ | 409.479 | | | | | | |
| | | | $d_2$ | 15.500 | | | | |
| | $r_3$ | −38.912 | | | | | | |
| | | | $d_3$ | 2.000 | $N_2$ | 1.6830 | $\nu_2$ | 31.5 |
| $M_1$ | $r_4$ | −67.502 | | | | | | |
| | | | $d_{3'}$ | −2.000 | $N_{2'}$ | −1.6830 | $\nu_{2'}$ | 31.5 |
| | $r_{3'}$ | −38.912 | | | | | | |
| | | | $d_4$ | −14.000 | | | | |
| | $r_5$ | −24.806 | | | | | | |
| | | | $d_5$ | −1.000 | $N_3$ | −1.7005 | $\nu_3$ | 30.1 |

TABLE 3-continued

[Embodiment 3]
$f = 100.0 \quad 2\omega = 9°40'$

|  |  | Radius of Curvature | | Axial Distance | Refractive Index | | Abbe Number |
|---|---|---|---|---|---|---|---|
| $L_R$ | $M_2$ | $r_6$ | −46.654 | | | | |
|  |  | | | $d_{5'}$ 1.000 | $N_{3'}$ | 1.7005 | $\nu_{3'}$ 30.1 |
|  |  | $r_{5'}$ | −24.806 | | | | |
|  |  | | | $d_{4'}$ 13.400 | | | |
|  | $M_1$ | $r_7$ | −12.738 | | | | |
|  |  | | | $d_6$ 0.600 | $N_4$ | 1.5168 | $\nu_4$ 64.1 |
|  |  | $r_{3''}$ | −38.912 | | | | |
|  |  | | | $d_{3''}$ 2.000 | $N_{2''}$ | 1.6830 | $\nu_{2''}$ 31.5 |
|  |  | $r_{4'}$ | −67.502 | | | | |
|  |  | | | $d_7$ 1.000 | | | |
|  |  | $r_8$ | −24.225 | | | | |
|  |  | | | $d_8$ 0.600 | $N_5$ | 1.5168 | $\nu_5$ 64.1 |
|  |  | $r_9$ | −41.271 | | | | |

$D = 17.3$
$L = 14.0$
$f_R = 22.97$

TABLE 4

[Embodiment 4]
$f = 100.0 \quad 2\omega = 8°14'$

|  | | Radius of Curvature | Axial Distance | Refractive Index | | Abbe Number |
|---|---|---|---|---|---|---|
| $L_1$ | $r_1$ | 48.806 | | | | |
|  | | | $d_1$ 2.000 | $N_1$ | 1.5176 | $\nu_1$ 53.5 |
|  | $r_2$ | 95.713 | | | | |
|  | | | $d_2$ 15.500 | | | |
| $M_1$ | $r_3$ | −29.534 | | | | |
|  | | | $d_3$ 2.000 | $N_2$ | 1.5168 | $\nu_2$ 64.1 |
|  | $r_4$ | −50.139 | | | | |
|  | | | $d_{3'}$ −2.000 | $N_{2'}$ | −1.5168 | $\nu_{2'}$ 64.1 |
|  | $r_{3'}$ | −29.534 | | | | |
|  | | | $d_4$ −13.800 | | | |
| $M_2$ | $r_5$ | −19.865 | | | | |
|  | | | $d_5$ −1.000 | $N_3$ | −1.5176 | $\nu_3$ 53.5 |
|  | $r_6$ | −36.711 | | | | |
|  | | | $d_{5'}$ 1.000 | $N_{3'}$ | 1.5176 | $\nu_{3'}$ 53.5 |
|  | $r_{5'}$ | −19.865 | | | | |
|  | | | $d_6$ 14.000 | | | |
| $L_R$ | $r_7$ | −12.984 | | | | |
|  | | | $d_7$ 0.500 | $N_4$ | 1.7495 | $\nu_4$ 50.1 |
|  | $r_8$ | 52.803 | | | | |
|  | | | $d_8$ 0.200 | | | |
|  | $r_9$ | 52.632 | | | | |
|  | | | $d_9$ 1.000 | $N_5$ | 1.7400 | $\nu_5$ 28.3 |
|  | $r_{10}$ | −67.502 | | | | |

$D = 14.4$
$L = 13.8$
$f_R = 21.74$

Figure 1:
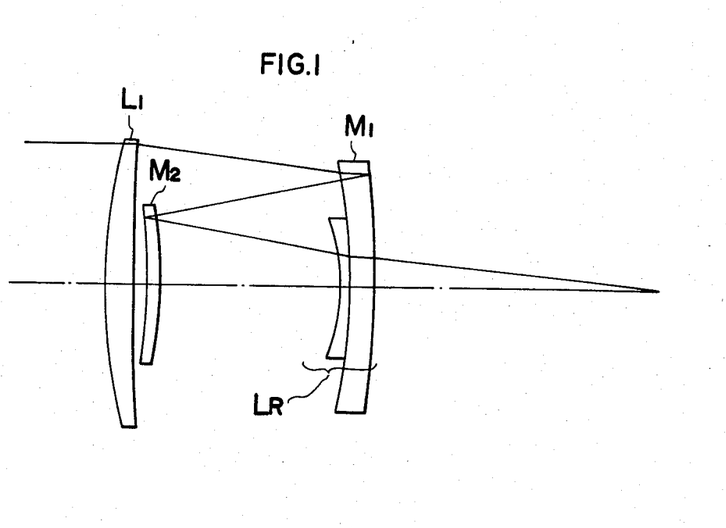
FIG. 1 is a schematic view of a first preferred embodiment of the present invention.
Figure 2A:
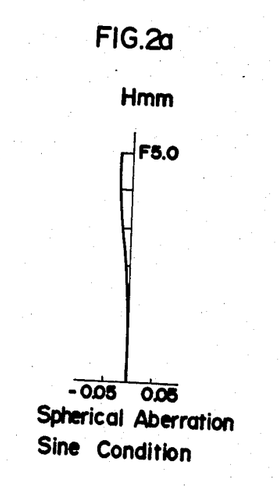
FIGS. 2a, 2b and 2c are respectively, graphical plots of the sphericaL aberration, astigmatism and distortion of the lens system of the first preferred embodiment.
Figure 2B:
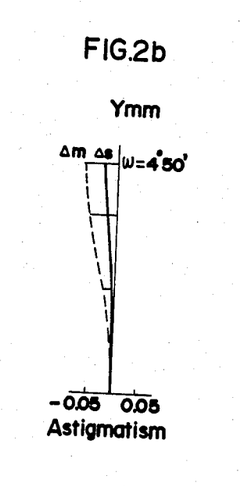
Figure 2C:
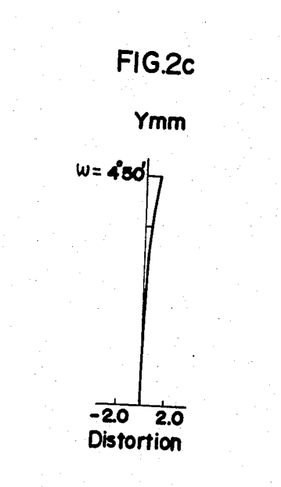

In the first embodiment, lens component $L_R$ is formed by the central part of the main-mirror $M_1$ and the negative meniscus lens is cemented on the object side surface of the main-mirror $M_1$. In this case, the lens system can be most economically produced since only four lens elements are required. Further, the peripheral edge of the negative meniscus lens cemented on the main-mirror is available for mounting the light-shielding cylinder which is to be provided between the main-mirror and sub-mirror.

Figure 3:
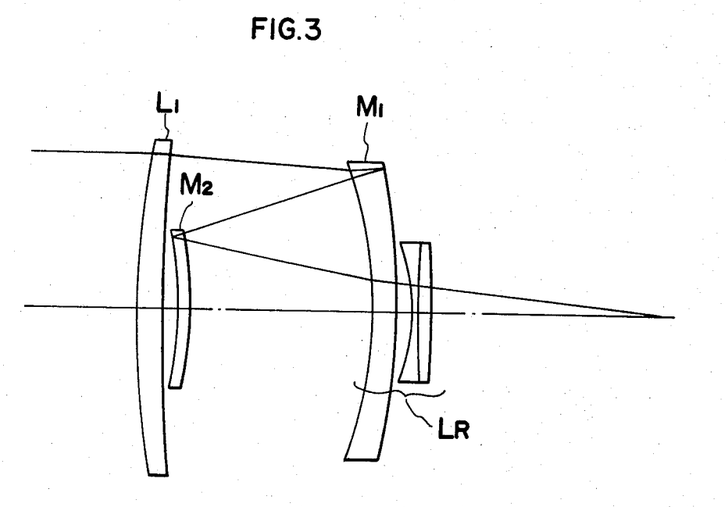
FIG. 3 is a schematic view of a second preferred embodiment of the present invention.
Figure 4A:
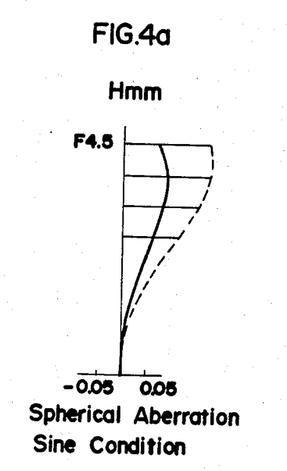
FIGS. 4a, 4b and 4c are respectively, graphical plots of the spherical aberration, astigmatism and distortion of the lens system of the second preferred embodiment.
Figure 4B:
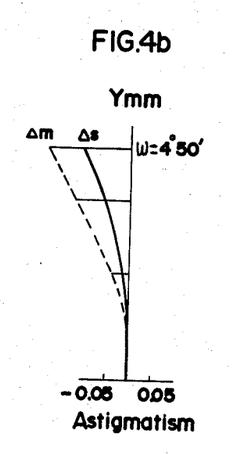
Figure 4C:
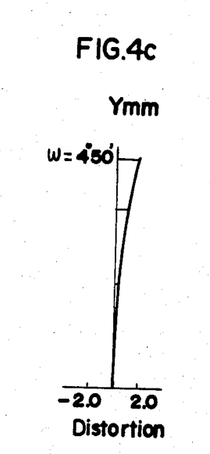

In case of the second embodiment, lens component $L_R$ is composed of the central part of the main-mirror $M_1$ and a lens component located adjacently to the main-mirror $M_1$ at the image side thereof. The lens component at the image side of the main-mirror $M_1$ has an object side surface remarkably concave to the object side. This object side surface has a function of shifting the spherical aberration to the positive side as shown in FIG. 4a. FIG. 4a discloses that the actual focal plane is set behind the paraxial image plane. This setting of the actual focal plane may seem to contradict the image surface seen from FIG. 4b. However, this setting is correct since the zonal to marginal rays, which would generally focus behind the paraxial image plane as the flare component in case of the condition as in FIG. 4b, are intentionally utilized to form an image according to the present invention. It should be noted that the central part of the incident light pencil does not participate in forming the image since the present invention system is of catadioptric type. Further, in the case of the second embodiment, the total length of the system can be reduced, since the refractive powers of the main-mirror and the sub-mirror are capable of being increased more than in the case of the first embodiment.

Figure 5:
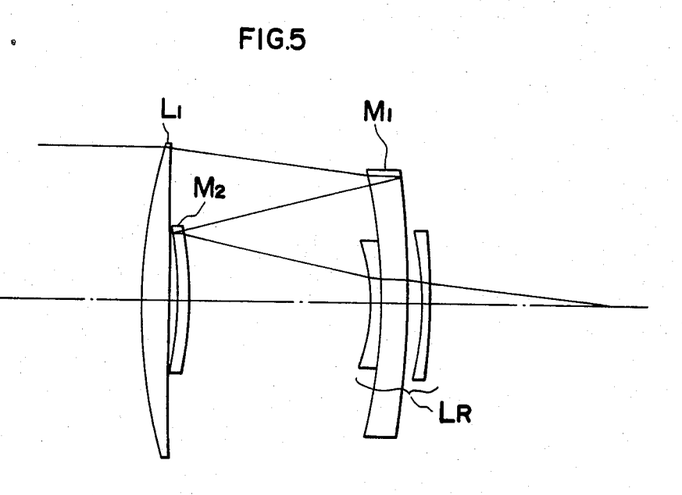
FIG. 5 is a schematic view of a third preferred embodiment of the present invention.
Figure 6A:
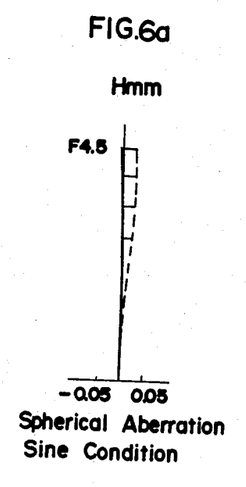
FIGS. 6a, 6b and 6c are respectively, graphical plots of the spherical aberration, astigmatism and distortion of the lens system of the third preferred embodiment.
Figure 6B:
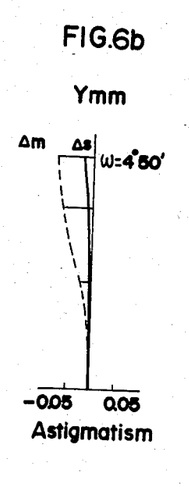
Figure 6C:
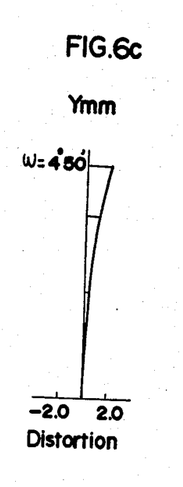
Figure 7:
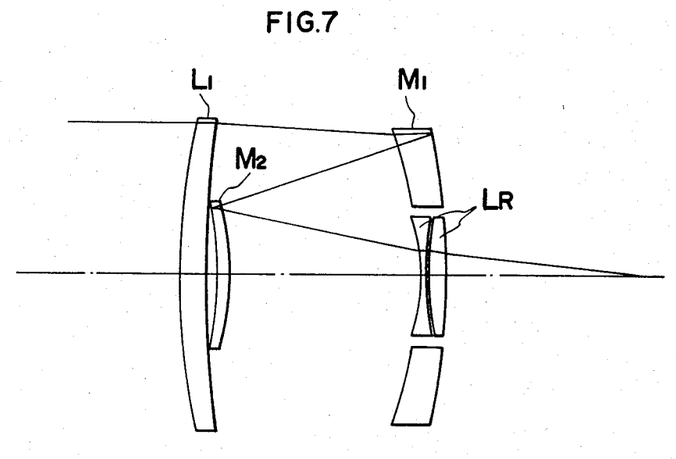
FIG. 7 is a schematic view of a fourth preferred embodiment of the present invention.
Figure 8A:
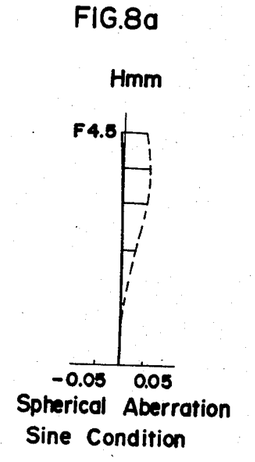
FIGS. 8a, 8b and 8c are respectively, graphical plots of the spherical aberration, astigmatism and distortion of the lens system of the fourth preferred embodiment.
Figure 8B:
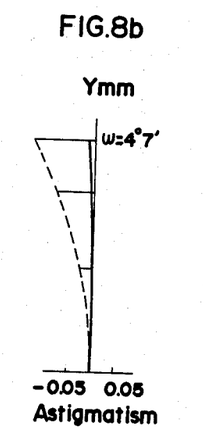
Figure 8C:
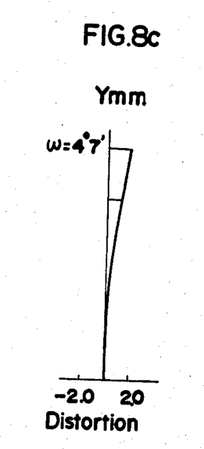

The lens component $L_R$ in the third embodiment is realized by a combination of the central part of the main-mirror $M_1$, the negative meniscus lens cemented to the main-mirror $M_1$ at the object side thereof and a negative meniscus lens concave to the object side located adjacently to the main-mirror $M_1$ at the image side thereof. This means that the first embodiment with one lens element added thereto makes a lens system of the type of the third embodiment, which is capable of having a lens component $L_R$ of a shorter focal length $f_R$ than that in the first embodiment. The third embodiment has greater powers for $M_1$, $M_2$ and $L_R$ and less total length, than those in the first embodiment.

In the fourth embodiment, it should be noted that lens component $L_R$ is composed of a negative lens having an object side surface remarkably concave to the object side and a positive lens, which are positioned within a space formed by hollowing out the central part of the main-mirror $M_1$. In this case, the lens component $L_R$ can be formed by a cemented doublet or a single lens in place of the two separate single lenses as in FIG. 7.

As it will be readily understood by those skilled in the optical arts the present invention is capable of many modifications and improvements within the scope and spirit thereof. Accordingly the invention is not intended to be limited by the specific disclosed embodiments but should be measured solely from the following claims.

What is claimed is:

1. A Catadioptric lens system comprising in the order of the transmission of a light ray in the system:
   a positive single lens ($L_1$) having an object side surface convex to the object side;
   a main-mirror element ($M_1$) concave to the object side;
   a sub-mirror element ($M_2$) convex to the image side; and
   a lens component ($L_R$) of a negative refractive power including the last refracting surface of the system, wherein the axial distance L between the main-mirror element ($M_1$) and the sub-mirror element ($M_2$) fulfills the following condition in relation to the diagonal length D of the rectangular focal plane on which the image is projected:

$$1.5 D > L > 0.5 D.$$

2. The invention of claim 1, wherein the main-mirror element ($M_1$) is composed of a negative meniscus single lens element concave to the object side, the image side surface of which serves as a reflecting surface faced to the object side, and the central part of the negative meniscus single lens element of the main-mirror with at least one additional lens element serves as the lens component ($L_R$).

3. The invention of claim 2, wherein the lens component ($L_R$) comprises additional lens elements located at both sides of the central part of the negative meniscus single lens element of the main-mirror.

4. The invention of claim 1, wherein the main-mirror element ($M_1$) is composed of a center-hollowed negative meniscus single lens element concave to the object side, the image side surface of which serves as a reflecting surface faced to the object side, and the lens component ($L_R$) is located in the hollow of the negative meniscus single lens element.

5. The invention of claim 1, wherein the sub-mirror element ($M_2$) is composed of a positive meniscus single lens element convex to the image side, the object side surface of which serves as a reflecting surface faced to the image side, and the radii of curvature $R_5$ and $R_6$ of the respective image side and object side surfaces of the positive meniscus single lens element fulfill the following condition in relation to the focal length f of the system:

$$0.8f > \frac{R_5 \cdot R_6}{R_6 - 3R_5} > 0.25f.$$

6. A Catadioptric lens system comprising in the order of the transmission of a light ray in the system:
   a positive single lens ($L_1$) having an object side surface convex to the object side;
   a main-mirror element ($M_1$) composed of a negative meniscus single lens element concave to the object side, the image side surface of which serves as a reflecting surface faced to the object side;
   a sub-mirror element ($M_2$) composed of a positive meniscus single lens element convex to the image side, the object side surface of which serves as a reflecting surface faced to the image side; and
   a lens component ($L_R$) of a negative refractive power including the last refracting surface of the system, wherein the radius of curvature $R_5$ of the image side surface of the positive meniscus single lens element and the radius of curvature $R_6$ of the object side surface of the same fulfill the following condition in relation to the focal length f of the system;

$$0.8f > \frac{R_5 \cdot R_6}{R_6 - 3R_5} > 0.25f.$$

7. The invention of claim 6, wherein the axial distance L between the main-mirror element ($M_1$) and the sub-mirror element ($M_2$) fulfills the following condition in relation to the diagonal length D of the rectangular focal plane on which the image is projected:
$$1.5D > L > 00.5D.$$

8. The invention of claim 7, wherein the lens component ($L_R$) is formed by the central part of the negative meniscus single lens element of the main-mirror and an additional negative meniscus lens element cemented thereto at the object side thereof.

9. The invention of claim 8, wherein the lens component ($L_R$) further comprises a further additional negative meniscus lens element concave to the object side located at the image side of negative meniscus single lens element of the main-mirror.

10. The invention of claim 7, wherein the lens component ($L_R$) is formed by the central part of the negative meniscus single lens element of the main mirror and an additional lens having an object side surface concave to the object side located at the image side of the negative meniscus single lens element of the main-mirror.

11. The invention of claim 7, wherein the negative meniscus single lens element has a hollow in the center thereof, and the lens component ($L_R$) comprises at least a negative meniscus lens concave to the object side located in the hollow of the negative meniscus single lens element of the main-mirror.

12. Catadioptric lens system comprising the following design parameters:

|  | Radius of Curvature | | $f = 100.0 \quad 2\omega = 9°40'$ Axial Distance | | Refractive Index | | Abbe Number | |
|---|---|---|---|---|---|---|---|---|
| $L_1$ | $r_1$ | 60.572 | $d_1$ | 2.000 | $N_1$ | 1.5176 | $\nu_1$ | 53.5 |
|  | $r_2$ | 173.817 | $d_2$ | 15.600 |  |  |  |  |
| $M_1$ | $r_3$ | −29.825 | $d_3$ | 1.600 | $N_2$ | 1.5168 | $\nu_2$ | 64.1 |
|  | $r_4$ | −51.174 | $d_{3'}$ | −1.600 | $N_{2'}$ | −1.5168 | $\nu_{2'}$ | 64.1 |
|  | $r_{3'}$ | −29.825 | $d_4$ | −13.600 |  |  |  |  |
| $M_2$ | $r_5$ | −19.373 | $d_5$ | −1.000 | $N_3$ | −1.5168 | $\nu_3$ | 64.1 |
|  | $r_6$ | −36.927 | $d_{5'}$ | 1.000 | $N_{3'}$ | 1.5168 | $\nu_{3'}$ | 64.1 |
|  | $r_{5'}$ | −19.373 | $d_{4'}$ | 13.600 |  |  |  |  |
| $L_R$ | $M_1$ $r_{3''}$ | −29.825 | $d_{3''}$ | 1.600 | $N_{2''}$ | 1.5168 | $\nu_{2''}$ | 64.1 |
|  | $r_{4'}$ | −51.174 | $d_6$ | 1.200 |  |  |  |  |
|  | $r_7$ | −13.015 | $d_7$ | 0.560 | $N_4$ | 1.5168 | $\nu_4$ | 64.1 |
|  | $r_8$ | 266.647 | $d_8$ | 0.760 | $N_5$ | 11.7400 | $\nu_5$ | 28.3 |
|  | $r_9$ | −77.979 |  |  |  |  |  |  |

$D = 17.3$
$L = 13.6$
$f_R = -27.15$